Inventor:
Gunther E. Fenner,
by Marvin Snyder
His Attorney.

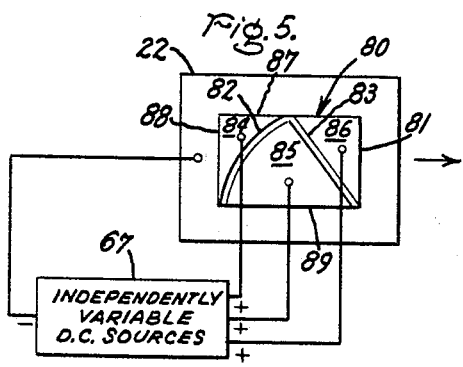
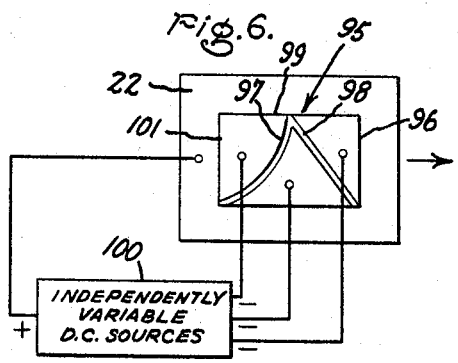
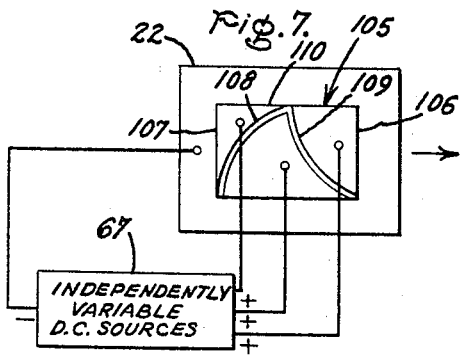
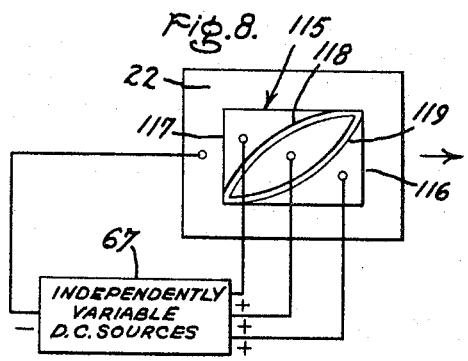
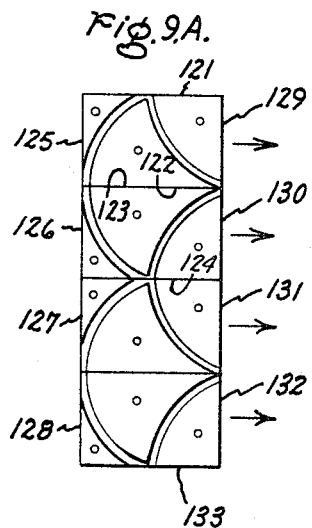
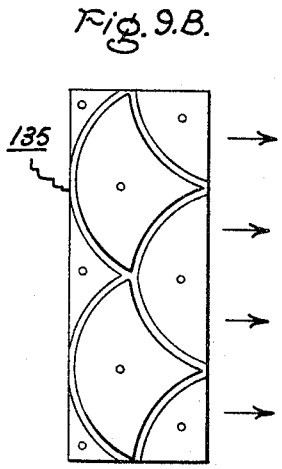

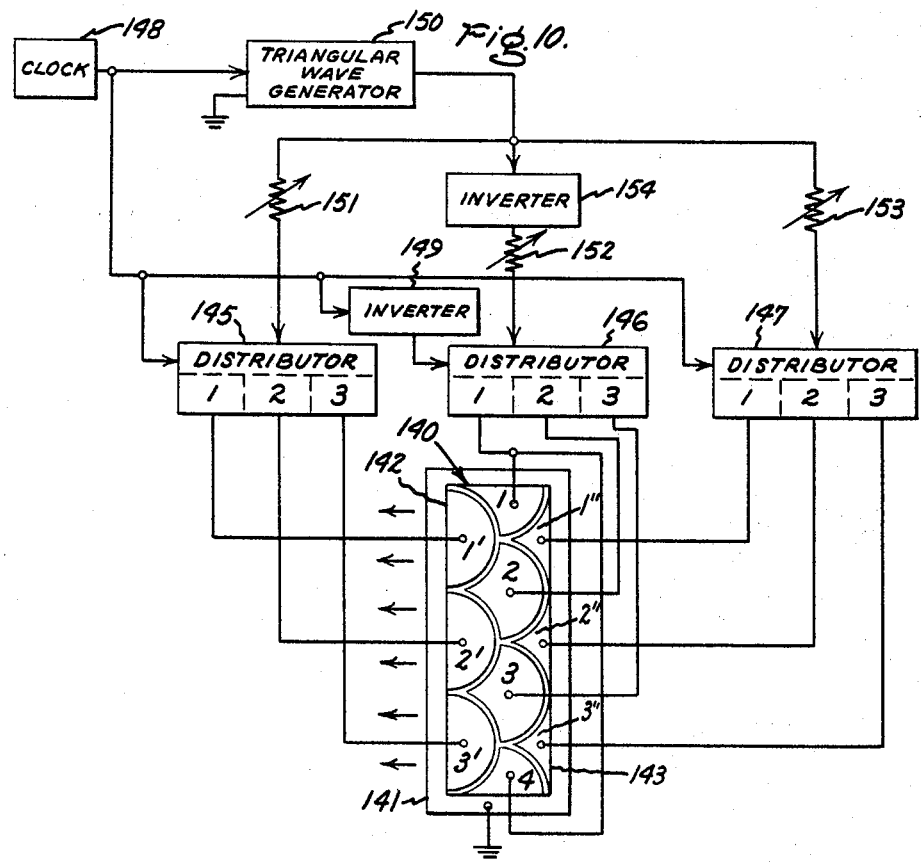
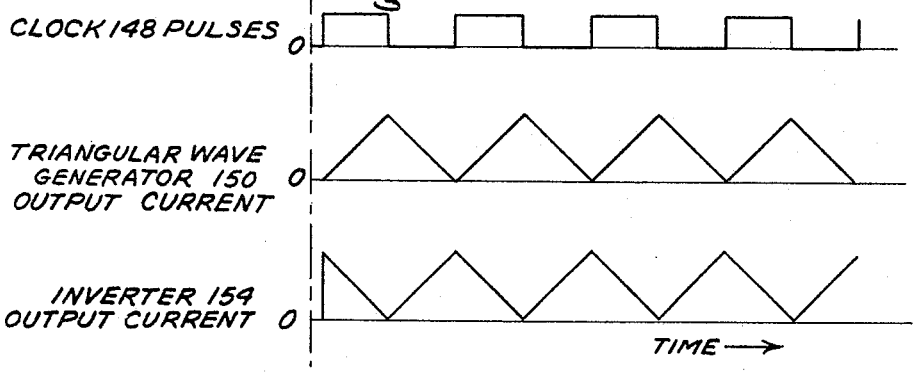
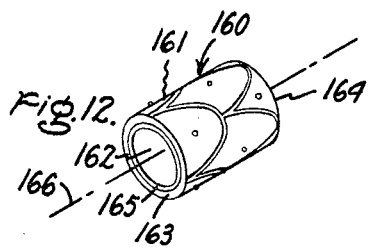
Inventor:
Gunther E. Fenner,
by Marvin Snyder
His Attorney.

United States Patent Office 3,436,679
Patented Apr. 1, 1969

3,436,679
SEMICONDUCTOR JUNCTION LASER WITH ELECTRONICALLY DISPLACEABLE AND DEFLECTABLE BEAM
Gunther E. Fenner, Schenectady, N.Y., assignor to General Electric Company, a corporation of New York
Filed Mar. 7, 1966, Ser. No. 532,417
Int. Cl. H01s 3/00, 3/18
U.S. Cl. 331—94.5      20 Claims This invention relates to semiconductor junction lasers, and more particularly to means for electronically displacing and deflecting a beam of stimulated coherent radiation emitted from a semiconductor junction diode so as to achieve beam scanning or switching.

Semiconductor junction diodes adapted to emit coherent radiation are described in R. N. Hall, U. S. patent application Ser. No. 232,846, filed Oct. 24, 1962, and assigned to the instant assignee. Diodes of this type are herein referred to as semiconductor junction lasers.

The advent of semiconductor junction lasers has enabled highly efficient production of stimulated coherent radiation of energy, including visible and infrared light, as well as microwaves. The wavelengths of electromagnetic radiation emitted by such lasers depend upon the band gap, or energy difference between the conduction and valence bands of the particular semiconductor. Heretofore, however, a change in position of the emitted beam of radiation has been difficult to achieve except in a preferred embodiment, by application of a magnetic field to a cylindrical junction diode as described in G. E. Fenner, U.S. patent application Ser. No. 492,181, filed Oct. 1, 1965 and assigned to the instant assignee. Linear beam scanning, moreover, has heretofore required physical movement of either the laser or at least some part of the optical system through which the beam is directed. However, in applications requiring beam displacement where no physical movement of either the diode or some part of the optical system can be tolerated, or in applications where presence of a magnetic field to accomplish beam scanning might have deleterious effect, it would be highly desirable to provide circuitry for electronically displacing or deflecting the beam without dependence on physical movement anywhere in the system.

The present invention concerns a semiconductor junction laser having provision to displace or deflect the emitted beam by dividing one of the opposite conductivity type regions of the diode into a plurality of zones separated by at least one strip of high resistance, which may be formed by a groove, directed obliquely with respect to the emitting face. The index of refraction of each of the diode sections thus produced is individually controlled by injection of charge carriers into each of the respective sections. This variation of refractive index in accordance with an injected current, is described in the publication entitled, The Effect of Injected Mobile Charge Carriers on the Dielectric Constant of a Solid With Application to the Frequency Modulation of Lasers, by Gunther E. Fenner (May 1965), a copy of which may be obtained through Rennselaer Polytechnic Institute, Troy, N.Y.

By requiring that the beam pass through the aforementioned plurality of sections, the difference in refractive indices at the interfaces between sections causes the beam to bend toward the normal to the interface at the point of incidence when passing from one medium to another of higher refractive index, and away from the normal to the interface at the point of incidence when passing into a medium of lower refractive index. Hence, by controlling index of refraction in individual diode sections, the amount of beam deflection may be controlled.

Further, by using two non-parallel strips of high resistance such as grooves in one of the opposite conductivity type regions of the diode, each groove directed generally obliquely with respect to the diode emitting face, and at least one of the grooves following a curved or non-linear path, it is possible, by controlling current applied to individual diode sections, to continuously displace the beam across the junction at the emitting face. Since the diode of the present invention directly produces its own light, scanning speeds attainable with this device are far in excess of those attainable with conventional flying-spot scanners, which require excitation of a phosphor with an electron beam and are thereby limited in speed by response time of the phosphor. On the other hand, if both of the non-parallel grooves in the diode of the present invention are linear, discontinuous switching of the beam from one predetermined location along the junction to another may readily be achieved.

Accordingly, one object of this invention is to provide a device which emits coherent light in an electronically controllable direction.

Another object is to provide a coherent light source capable of scanning at an extremely rapid rate.

Another object is to provide a semiconductor junction laser having means for discontinuously shifting the beam emitting location from one point along the junction to another.

Another object is to provide a semiconductor junction laser having means for continuously shifting the beam emitting location on the emitting face of the laser across the entire intersection of the junction and the emiting face.

Another object is to provide a semiconductor diode laser having means for discontinuously shifting beam emission from one face of the diode to another.

Briefly, in accordance with a preferred embodiment of the invention, there is provided a semiconductor junction laser for emitting coherent radiation from a selectively controllable location along one of two parallel reflecting surfaces of the laser. The laser comprises a monocrystalline body of direct transition semiconductive material having a pair of degenerate opposite conductivity type regions contiguous with and defining a thin junction region in the monocrystalline body. The junction region is disposed orthogonally between the two parallel reflecting surfaces of the laser, with at least one of the opposite conductivity type regions being divided into a plurality of zones separated by at least one strip of high resistance directed generally obliquely to the parallel reflecting surfaces. By applying voltages to each of the opposite conductivity type regions, with each of the zones being separately energized, the refractive index of each portion of the junction underlying each of the respective zones may be selectively controlled, enabling manipulation of the emitted beam with regard to both displacement and deflection.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIGURE 5 is a top-view schematic diagram of a laser having two grooves in one of the opposite conductivity type regions wherein one of the grooves is linear and the other groove is nonlinear;

FIGURE 6 is a top-view schematic diagram of another laser wherein one of the two grooves in one of the opposite conductivity type regions is linear and the other groove is nonlinear;

FIGURE 7 is a top-view schematic diagram of a laser wherein one of the opposite conductivity type regions is divided into three sections by two nonlinear grooves;

FIGURE 8 is a top-view schematic diagram of another laser wherein one of the opposite conductivity type regions is divided into three sections by two nonlinear grooves;

FIGURE 9A is a top-view schematic diagram of a plurality of diodes having the groove configuration of FIGURE 7, arranged side-by-side with emitting faces aligned in a common plane;

FIGURE 9B is a top-view schematic diagram of a single diode formed with the resultant groove configuration of the side-by-side diodes illustrated in FIGURE 9A;

FIGURE 10 is a top-view schematic diagram of a laser having a plurality of nonlinear grooves therein and adapted to continuously scan its beam across the emitting face in the plane of the junction;

FIGURE 11 is a representation of waveforms used to aid in the description of operation of the laser of FIGURE 10; and FIGURE 12 is a schematic representation of a modification of the laser shown in FIGURE 10.

Figure 1:
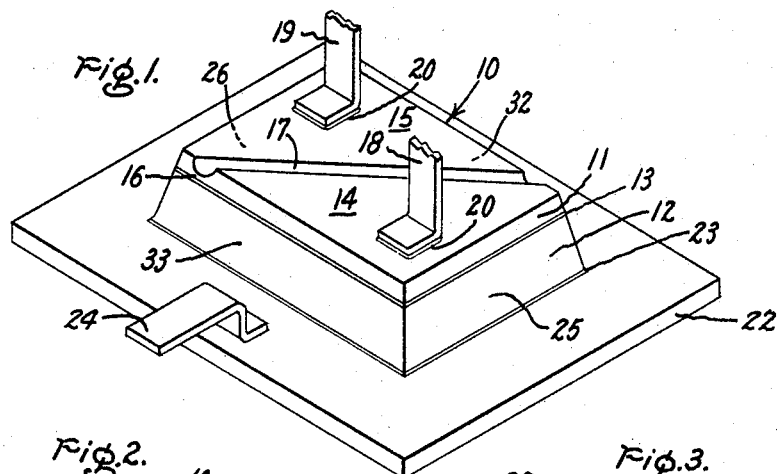
FIGURE 1 is an isometric view of a semiconductor junction laser having a single groove in one of the opposite conductivity type regions.

The laser shown in FIGURE 1, which is the simplest embodiment of the invention described herein, comprises a monocrystalline body 10 of semiconductive material having opposite conductivity type regions 11 and 12 which are doped to degeneracy. For illustrative purposes, region 11 is assumed to be of P-type conductivity, while region 12 is assumed to be of N-type conductivity. Regions 11 and 12 are contiguous with, and define, a continuous intermediate P-N junction region 13 within body 10. Either one of the two degenerate regions, here selected to be P-type region 11, is divided into two segments 14 and 15 which are connected by a relatively thin bridge-portion 16. Bridge-portion 16, which is an integral portion of P-type region 11 and contiguous with junction region 13, is produced as the result of a groove 17 which cuts across P-type region 11 at a uniform depth, almost to the depth of junction region 13, and divides P-type region 11 into segments or zones 14 and 15.

Non-rectifying contact is made to sections 14 and 15 from a pair of electrodes 18 and 19, respectively, through an acceptor type or electrically neutral solder 20. N-type region 12 is secured to a header 22 with a layer of donor type or electrically neutral solder 23. Header 22 is in turn connected to an electrode 24 by, for example, welding, brazing, etc. Preferably, header 22 is large in relation to diode 10, and thus also serves as a base or mechanical support member for the laser structure.

Semiconductor body 10 may be cut in such manner that the front surface 25 and rear surface 26 may be polished to exact parallelism in planes which are perpendicular to the plane of junction region 13. Alternatively, semiconductor body 10 may be cleaved, in order to achieve this parallelism. This parallelism is necessary in order that a standing wave pattern may be established within the semiconductor crystal to obtain high efficiency emission of coherent radiation through one of faces 25 and 26, such as face 25. In general, even slight deviations from exact parallelism, which is defined infra, cause corresponding decreases in emission efficiency. Reflecting surfaces 25 and 26, which define a resonant cavity therebetween, are known in the art as Fabry-Perot surfaces.

The material from which semiconductor crystal 10 is cut may comprise, in general, a compound semiconductor or alloy of compound semiconductors in Group III-Group V of the periodic table. These semiconductors, denominated direct transition semiconductors, are characterized by direct transitions of electrons between valence and conduction bands, and include, for example, gallium arsenide, indium antimonide, indium arsenide, indium phosphide, gallium antimonide, and alloys therebetween. These semiconductors may also include direct transition alloys of other materials, such as alloys of gallium arsenide and gallium phosphide (which is indirect by itself) in the range of up to approximately 40 atomic percent of gallium phosphide. Further discussion of direct transition semiconductors may be obtained in an article by H. Ehrenreich, 32, Journal of Applied Physics, 2155 (1961).

Both the N-type and P-type regions of semiconductor crystal 10 are impregnated or doped with donor and acceptor activators, respectively, to cause degeneracy therein. A semiconductor body may be considered degenerate N-type when it contains a sufficient concentration of excess donor impurity carriers to raise the Fermi level thereof to a value of energy higher than the minimum energy of the conduction band on the energy band diagram of the semiconductive material. Similarly, semiconductor body 10 may be considered degenerate P-type when sufficient concentration of excess acceptor impurity carriers exists therein to depress the Fermi level to a value of energy lower than the maximum energy of the valence band on the energy band diagram for the semiconductive material. In gallium arsenide, degeneracy is initially obtained when the excess negative conduction carrier concentration exceeds $10^{17}$ per cubic centimeter or when the excess positive conduction carrier concentration exceeds $10^{18}$ per cubic centimeter. The Fermi level represents the energy at which the probability that an electron is present in a particular state is 50%.

Materials suitable for rendering degenerate the N-type and P-type regions of the various semiconductors from which devices of the present invention may be fabricated depend upon the particular semiconductive material utilized, and are not necessarily the same in each case, even though the materials may be of the same class. Thus, all of the Group III-Group V periodic table compounds utilize sulphur, selenium and tellurium as donors and zinc, cadmium, mercury and magnesium as acceptors. On the other hand, tin, germanium, and silicon may serve as donors or acceptors, depending upon the particular semiconductor and the method of preparation; for example, in gallium antimonide grown from a stoichiometric melt they are all acceptors. In indium antimonide, tin is a donor, while germanium and silicon are acceptors. In the remaining direct transition semiconductors of the Group III-Group V type, tin, germanium and silicon are all donors.

Other direct transition semiconductive materials suitable for use in the invention include lead sulphide, lead selenide and lead telluride. In these materials, indium is suitable as a donor, and excess anions are suitable acceptors. In general and donor and acceptor pair having sufficiently high solubilities in the specific material of crystal 10 may be utilized to form the degenerately impregnated or doped regions 11 and 12 of the crystal.

As one example of how a device may be constructed in accordance with the present invention as illustrated in FIGURE 1, a flat wafer is cut from a monocrystalline ingot of N-type gallium arsenide which is impregnated or doped with approximately $10^{18}$ atoms per cubic centimeter of tellurium by growth from a melt of gallium arsenide containing a concentration of at least $3 \times 10^{18}$ atoms per cubic centimeter of tellurium. Thus, the wafer is degenerately N-type. The P-N junction region is formed in a horizontal plane by diffusing zinc into all surfaces of the wafer at a temperature of approximately 1000° C. for approximately a half hour using an evacuated sealed quartz tube containing the gallium arsenide wafer and 10 milligrams of zinc, thus producing a P-N junction region of approximately 1000 angstrom units in thickness at a distance of approximately 0.1 millimeter below all surfaces of the wafer. The wafer is then cut and ground to remove all except one such planar junction. As cut, the wafer may typically be 0.5 millimeter by 0.4 by 0.4 millimeter on its faces. Front and rear surfaces 25 and 26 respectively, which are perpendicular to the P-N junction, are then polished to optical smoothness and to exact parallelism. In the case of the aforementioned gallium arsenide diode, "exact parallelism" requires parallelism to approximately ±0.1 micron. Alternatively, exact parallelism may be obtained by proper cleavage of the crystal. Side surfaces 32 and 33 of the crystal are cut so as to form a tapered structure and thereby preclude any possibility of transverse standing waves occurring within the crystal. Alternatively, the side surfaces may be roughened with abrasive for the same purpose. Acceptor solder used with the gallium arsenide crystal is an alloy of 3% by weight of zinc and the remainder of indium, while donor solder for use therewith is of tin.

Although thickness of junction region 13 may be from 300 to 20,000 angstrom units, as determined by junction capacity measurement at zero bias, it is preferable to maintain junction thickness at approximately 500 to 2,000 angstrom units. This thickness determines both energy radiation efficiency and threshold current required for coherent emission. Junction thickness may also determine feasibility of operating the diode on a continuous wave basis. Moreover, junction thickness is important in determining temperature of operation and power output. Phenomenologically, minimum junction thickness is set by practical considerations and may be any small but finite dimension which prevents appreciable quantum mechanical tunnelling under forward bias. Maximum junction layer thickness should not exceed approximately twice the longer of the two minority charge carrier diffusion lengths on either side of the intermediate or junction region.

To adapt the semiconductor junction laser for use in accordance with the present invention, a device as set forth above is provided with a strip of high resistance, resulting from a separating groove 17 which is etched or otherwise formed in one of the degenerate opposite conductivity type regions 11 and directed obliquely to parallel reflecting or Fabry-Perot faces 25 and 26. By extending the groove from one non-reflecting face 32 to the other non-reflecting face 33, region 11 is divided into two zones 14 and 15, which define corresponding underlying portions of the junction region. The thickness of bridge 16 connecting zones 14 and 15 of region 11 may be made as thin as possible, provided only that the groove not extend into junction region 13, in order to avoid scattering loss in the device.

Groove 17 may readily be formed by etching gallium arsenide diode 10 in a solution of, for example, three parts concentrated nitric acid to one part of 30% hydrofluoric acid, after first masking with a suitable inert masking material, such as black wax ("Apiezon W") or a photosensitive polymerizable material, all portions of the diode not to be etched. The etching process is preferably conducted in a plurality of steps, typically from three to ten. During each step, the diode is exposed to the etching solution for approximately one second, and then quickly rinsed in water. After each step, groove resistance, or resistance between zones 14 and 15 of region 11 is measured. A typical starting resistance is about 0.2 ohm, and a suitable device has been completed when this resistance has increased to about 1 ohm or more. The masking material is next dissolved in a suitable solvent therefore, such as acetone in the case of black wax, and the electrodes are attached, resulting in a device as shown in FIGURE 1.

Alternatively, zones 14 and 15 may be formed in region 11 by other methods, such as by diffusion of impurities through a mask, in order to obtain the desired resistance between zones. Accordingly, it should be understood that the grooves in any configuration illustrated herein may be replaced by strips of high resistance formed in this manner.

Figure 2:
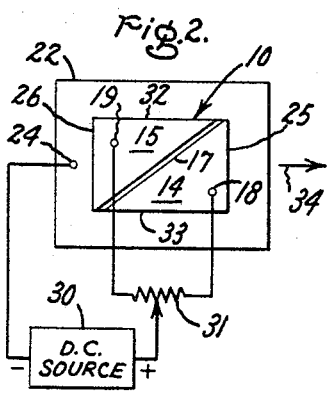
FIGURE 2 is a top-view schematic diagram of the laser of FIGURE 1 showing means for energizing the laser.

In operation, the device of FIGURE 1 is connected as shown schematically in FIGURE 2, wherein like numerals indicate like elements. A source of direct current 30 capable of supplying either steady-state or pulsating DC, is applied to zones 14 and 15 through a variable potentiometer 31, which enables selective application of different current amplitudes to each of the zones. Diode 10 is subjected to DC pulses at high current density levels, such as approximately 2,000 to 20,000 amperes per square centimeter for a gallium arsenide diode. To avoid overheating the diode, the pulse width is conveniently kept within a level of approximately 1 to 10 microseconds. However, since the threshold, or minimum current density required for stimulated emission of coherent radiation from a gallium arsenide diode, is related to diode temperature, the diode may be subjected to a low temperature in order to establish a low threshold and preclude necessity for a high current source. For example, immersion of a gallium arsenide diode in a Dewar of liquid air at a temperature of approximately 77° K. establishes a threshold of approximately 2000 amperes per square centimeter. At liquid hydrogen temperatures, or approximately 20° K., the threshold is decreased to less than 500 amperes per square centimeters. Hence, with a junction area of approximately .0005 square centimeter, a 1.0 ampere pulsed current source is approximately as sufficient to produce coherent radiation from a gallium arsenide diode at 20° K. as a 0.25 ampere pulsed current source is to produce coherent radiation from a diode at 77° K. With sufficient cooling, continuous wave operation may be achieved.

Forward bias is applied to the sections of diode 10 underlying zones 14 and 15, as shown in FIGURE 2, through potentiometer 31 from DC source 30 which may be either steady or pulsed, depending upon whether or not continuous wave operation is to transpire. Diode 10 emits coherent radiation from face 25, as indicated by an arrow 34 representing emanation from face 25. The sections of diode 10 underlying zones 14 and 15 are each separately capable of lasing. The beam produced by diode 10 emerges from face 25 at the intersection with face 32 when current density in the section underlying zone 15 reaches the threshold value, and emerges from face 25 at the intersection with face 33 when current density in the section underlying zone 14 reaches the threshold value.

If groove 17 were perfectly uniform throughout, the beam would emerge from face 25 only at either intersection with the non-reflecting faces, regardless of relative current densities in the sections underlying zones 14 and 15. However, since it is virtually impossible to produce an absolutely uniform groove, approximate equality of these current densities results in emergence of a beam from face 25 at an indeterminate location along the junction somewhere between non-reflecting faces 32 and 33. This location is indeterminate since it depends upon the nature of the groove non-uniformities; moreover, since no two grooves in respective diodes can be absolutely identical, this indeterminate point of beam emergence varies from diode to diode.

For purposes of understanding the principles involved in the instant invention, assume that the laser beam emerges from diode 10 at the aforementioned indeterminate location. As long as the index of refraction is uniform throughout the junction, the laser beam emerges normal to the polished faces. Thus, since index of refraction of the semiconductive diode material is directly related to current density within the material, equal current density within each of the sections of diode underlying zones 14 and 15 causes the beam to emerge normal to the polished faces. However, since any change in current density within one of the sections changes the refractive index of that section, movement of the tap on potentiometer 31, can produce a change in direction (directional deflection) of the output beam. This phenomenon results from the fact that the groove makes an angle with the front or emitting face of the diode, so that the phase of the wavefront of the electromagnetic wave propagating within the resonant cavity defined by faces 25 and 26 changes in accordance with the change in phase velocity of the electromagnetic wave. Since the phase of the wavefront determines the direction of maximum radiation emerging from the crystal, as pointed out by G. E. Fenner et al., 34, Journal of Applied Physics, 3204 (1963), beam direction can be changed in the plane of the junction by a change of current in either of the diode sections.

In particular, when current density in zone 15 exceeds current density in zone 14, the index of refraction within the portion of junction underlying zone 14 exceeds the index of refraction within the portion of junction underlying zone 15. Hence, when the beam is situated in its indeterminate position in the junction, the beam within the portion of junction underlying zone 14 tends to bend toward the normal or groove 17 at the point of intersection therewith. With the beam situated in its indeterminate position in the junction, the beam then internally approaches face 25 at a slight angle therewith. However, since the beam emerges from face 25 into a much less dense medium, presumably air, the beam tends to bend away from the normal to this face, thereby magnifying the degree of bending of the beam. Thus, by controllably varying current density in zones 14 and 15, controllable beam deflection may be produced. However, if the beam is in close proximity to surface 32, the beam effectively remains wholly within the portion underlying zone 15. Therefore, very little internal refraction occurs, and the beam emerges substantially perpendicular to surface 25 at a point near the intersection of surfaces 25 and 32.

On the other hand, if current density within the portion of junction underlying zone 14 exceeds current density within the portion of junction underlying zone 15, the index of refraction in the former junction portion exceeds that of the latter junction portion, causing a tendency for the beam to deflect away from the normal to groove 17 at the point of incidence, within the portion of junction underlying zone 14. Assuming the beam to be situated in its indeterminate position, the beam again approaches face 25 at a slight angle therewith and, upon emerging into air, the beam tends to bend away from the normal to this face, thereby magnifying the degree of bending of the beam. However, if the beam is in close proximity to surface 33, the beam again effectively remains wholly within the portion of junction underlying zone 14, so that very little internal refraction occurs; hence, the beam emerges normal to surface 25 at a point near the corner of surface 25 and 33.

In the event current density in the portions of junction underlying zones 14 and 15 is identical, the beam cannot be deflected at groove 17, since the refractive indices in each of the portions of junction are identical. In such case, the beam emerges perpendicular to surface 25.

It should be noted that smooth shifting of the point of emergence of the beam from surface 25 with changes of current density in the portions of junction underlying regions 14 and 15, does ordinarily not occur. Rather, discontinuous shifting of the beam occurs, as explained above, so that it is possible to repeatedly produce beam emergence from only one of two spaced locations in the plane of the junction along surface 25.

Figure 3:
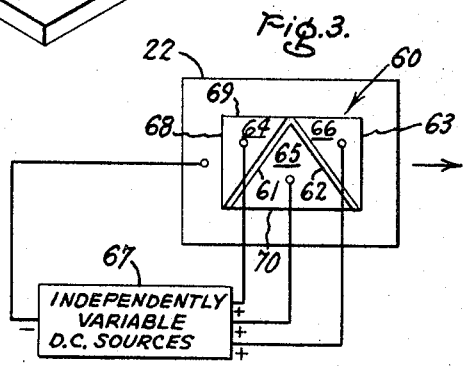
FIGURE 3 is a top-view schematic diagram of a laser having two linear grooves in one of the opposite conductivity type regions dividing the region into three sections.

Diode 60, mounted on header 22 as shown in FIGURE 3, also provides discontinuous shifting of the laser beam across a single emitting face 63. One of the opposite conductivity type regions, here again assumed to be the P-type region, is divided by a pair of intersecting grooves 61 and 62 directed along non-parallel paths which are both oblique with respect to emitting face 63. Grooves 61 and 62 divide the P-type region into sections 64 and 65, and sections 65 and 66, respectively. Sections 64, 65 and 66 of the P-type region are positively biased with respect to the N-type region by independently variable DC sources 7. These DC sources, although having independently variable voltage amplitudes, may comprise pulsed sources driven in synchronism; however, if the laser is to be operated with sufficient cooling to allow continuous wave operation, DC source 67 may comprise sources of continuous current.

Diode 60, like diode 10 of FIGURE 2, also has but two discontinuous beam emergence points along emitting face 63. A first of these points is along the junction at the corner of face 63 and non-reflecting face 69, while the second of the points is along the junction at the corner of emitting face 63 and non-reflecting face 70. The first point obtains when current density in the junction portion underlying zone 64 equals current density in the junction portion underlying zone 66, and the second point obtains when current density in the junction portion underlying zone 65 is sufficient to produce laser action in an ungrooved diode having the same dimensions and parameters as diode 60. As with diode 10 of FIGURE 2, no appreciable beam deflection occurs since, when the first point obtains, the internal beam effectively lies wholly within zones 64 and 66 which have equal refractive indices due to their equal current densities while, when the second point obtains, the internal beam effectively lies wholly within zone 65.

Figure 4A:
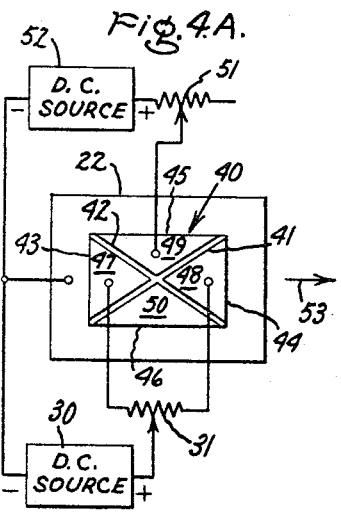
FIGURE 4A is a top-view schematic diagram of a laser having two linear intersecting grooves in one of the opposite conductivity type regions, energized to emit radiation from one of the faces.
Figure 4B:
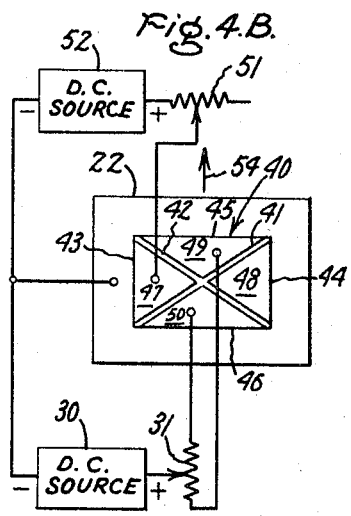
FIGURE 4B is a top-view schematic diagram of the laser shown in FIGURE 4A, connected to emit radiation from a face at right angles to the emitting face in FIGURE 4A.

FIGURES 4A and 4B schematically illustrate modifications of the invention shown in FIGURES 2 and 3. A top view of diode 40 mounted on header 22 is shown. A pair of crossed grooves 41 and 42 in one of the opposite conductivity type regions, here assumed to the P-type region, are directed transversely to all faces of diode 40. This diode has two pairs of opposed, highly polished, reflecting faces, with faces 43 and 44 comprising the first pair and faces 45 and 46 comprising the second; hence, the diode is capable of emitting radiation either from face 44, as indicated by arrow 53 in FIGURE 4A, or from face 45, as indicated by arrow 54 in FIGURE 4B, depending upon the form of energization. Thus, DC source 30, in FIGURE 4A, is connected through potentiometer 31 to zones 47 and 48 of the P-type portion of diode 40, which terminate at reflecting faces 43 and 44 respectively, while zone 49 of the P-type portion of diode 40, which terminates at reflecting face 45, is energized from a DC source 52 through a variable resistance such as a rheostat 51. Conversely, in FIGURE 4B, energization is supplied to sections 49 and 50 of diode 40 through potentiometer 31, and to zone 47 through rheostat 51. Section 50 terminates in reflecting face 46.

In operation, the embodiment shown in FIGURE 4A emits coherent radiation from face 44 at discontinuously shiftable points along the junction. Thus, if current in excess of the threshold value is applied to zones 47 and 48, the beam is generated in an axis of the junction lying midway between faces 45 and 46. If current through zones 47 and 48 is next reduced from the value which produced central axis lasing, no oscillations will be generated; that is, the diode will not lase. However, if current is now applied to zone 49, while current in zones 47 and 48 remains just below the value required for central axis lasing, eventually the gain in zone 49 becomes sufficiently high to cause lasing, with the axis of lasing now displaced to a location closely adjacent face 45. A similar circumstance prevails if current from DC source 52 is applied to zone 50 instead of zone 49. However, under these conditions, the beam is displaced to a location closely adjacent face 46 rather than face 45.

As an additional feature of diode 40, the roles of zones 47 and 48 may be replaced by zones 49 and 50, with either zone 47 or 48, selected to be zone 47 in FIGURE 4B, assuming the role of zone 49 as shown in FIGURE 4A. Under these circumstances, the beam emerges from the diode displaced by 90° from the previous direction of emission. As indicated by arrow 54 in FIGURE 4B, emission takes place from face 45. Moreover, application of current to zone 47 from DC source 52 can be employed to shift the position of emission from an axis of the diode junction lying midway between faces 43 and 44 to a location closely adjacent face 43 of the diode. Similarly, application of current to zone 48 instead of zone 47 can be used to shift the beam within the diode junction to a location closely adjacent face 44 of the diode.

Predictably, therefore, the beam may emerge from face 44 either at one end of the face or the other, or at the center thereof. Alternatively, the beam may emerge from face 45 either at one end of the face or the other, or at the center thereof. This follows from recognition of the fact that the groove configuration of diode 45 resembles that which would occur if a second diode having the groove configuration of diode 60 of FIGURE 3 were formed integrally with diode 60 so that the groove intersection on each diode would be in contact with the intersection on the other, resulting in a composite diode. In such case, the beam, when emitted from the first point described in conjunction with FIGURE 3, which is located along the junction at the corner of faces 63 and 69, would actually be emanating from the center of the emitting face of the composite diode. Emission from either end of the emitting face of the composite diode would continue to occur as described in conjunction with FIGURE 3.

Although the devices shown in FIGURES 4A and 4B provide capability of shifting the beam direction by 90°, those skilled in the art will recognize that a lens, such as a convex lens for example, having a diameter equal to the width of the diode emitting face, may be placed in front of the emitting face for the purpose of changing direction of the beam as the beam position is shifted along the lens diameter. Thus, the directional change would be greater when the beam passed through parts of the lens closer to the parameter than to the center, with a reversal of direction occurring in the event the beam were shifted from one side of the center to the other.

Diode 80 shown in FIGURE 5 is specifically fabricated to provide continuous scanning of the laser beam across the junction at emitting face 81. One of the opposite conductivity type regions, here again assumed to be the P-type region, is divided by first and second grooves 82 and 83 respectively, into zones 84 and 85, and zones 85 and 86, respectively. To provide continuous scanning, groove 82 is made curved or nonlinear, and is directed generally obliquely with respect to emitting face 81. Groove 83 is directed along a straight line path, also obliquely to face 81. Grooves 82 and 83 intersect at a non-reflecting face 87 of the laser. Zones 84, 85 and 86 of the P-type region are positively biased with respect to the N-type region by independently variable DC sources 67.

An analysis of the device of FIGURE 5 reveals the reason for continuous beam shifting, or scanning, to occur in the presence of a nonlinear groove 82. The condition for oscillation in the laser may be represented by the general expression $$GL = \ln \frac{1}{R} = K$$

where G is the net gain per unit length of the laser, L is the distance between emitting face 81 and parallel reflecting face 88, R is the reflectivity of faces 81 and 88, which is the same in a normal laser, and K is a constant.

Letting G vary as a function of $x$, where $x$ represents any arbitrary distance measured from face 88 in a direction toward face 81, then G($x$) may be written for each of the sections having a subscript corresponding to the respective section designation, as:

$G_{84}$ where $0 \leq x \leq x_{82}$
$G_{85}$ where $x_{82} \leq x \leq x_{83}$
and
$G_{86}$ where $x_{83} \leq x \leq L$ where $x_{82}$ and $x_{83}$ represent distance measured from face 88 to grooves 82 and 83, respectively. Therefore, the expression for laser action in crystal 80 may be written as:

$$G_{84}x_{82} + G_{85}(x_{83} - x_{82}) + G_{86}(L - x_{83}) = K$$

Assuming groove 83 follows a parabolic path, and that grooves 82 and 83 intersect at distance $L/2$ between faces 81 and 88, groove 82 may be expressed as $$x_{82} = \frac{L}{2}\left(\frac{y}{w}\right)^2$$

and groove 83 may be expressed as $$x_{83} = L - \frac{L}{2}\left(\frac{y}{w}\right)$$

where $w$ is the width of the junction as measured between non-reflecting parallel faces 87 and 89, and $y$ is any arbitrary distance along the junction measured from non-reflecting face 89 in a direction toward non-reflecting face 87.

The expression for laser action may now be rewritten as:

$$G_{84}\frac{L}{2}\left(\frac{y}{w}\right)^2 + G_{85}L\left[1 - \frac{y}{2} - \frac{1}{2}\left(\frac{y}{w}\right)^2\right] + G_{86}\frac{L}{2w}y = K$$

Differentiating K with respect to $y$, and equating to zero, the following expression is obtained:

$$\frac{dk}{dy} = G_{84}\frac{Ly}{w^2} + G_{85}L\left[-\frac{1}{2w} - \frac{y}{w^2}\right] + G_{86}\frac{L}{2w} = 0$$

while taking the second derivative of K with respect to $y$ results in the following expression:

$$\frac{d^2K}{dy^2} = G_{84}\frac{L}{w^2} - G_{85}\frac{L}{w^2}$$

For laser gain to be a maximum, $d^2K/dy^2$ must be negative. This criterion is met when $$G_{85} > G_{84}$$

and may be referred to as "condition I."

Solving for $y$ in the expression for the first derivative of K with respect to $y$ yields:

$$y = \frac{w}{2} \frac{G_{86} - G_{85}}{G_{85} - G_{84}}$$

which must be positive since $0 \leq y \leq w$. Hence, $$G_{86} > G_{85}$$

which may be referred to as "condition II."

Therefore, depending upon choice of effective gains in zones 84, 85 and 86, and the subject to conditions I and II, there exists a unique distance $y$ at which the gain G is maximum. Since the gain in each section of junction underlying each of the respective zones is dependent upon current density in the respective junction section, which in turn depends upon the applied voltage amplitude, control of the voltage applied to the various zones from DC sources 67 enables the beam to be scanned continuously across emitting face 81, in the plane of the junction.

Because the groove configuration of diode 80 facilitates positioning of the beam within the junction anywhere between non-reflecting faces 87 and 89, the beam internally passes through three distinct junction sections of the diode, demarcated by grooves 82 and 83, each of which sections may have a different index of refraction. By proper variation of current density in each of the sections, it is possible to achieve beam deflection either in conjunction with, or substantially independent of, beam displacement.

FIGURE 6 illustrates a diode 95 having an emitting face 96 parallel to a reflecting face 101, with one of the opposite conductivity type regions, here assumed to be the N-type region, separated into three zones by grooves 97 and 98. Groove 97 is curved or non-linear, with a slope changing in a direction opposite to that of groove 82 in FIGURE 5, and is directed generally obliquely with respect to emitting face 96. Groove 98 is linear, and also directed obliquely with respect to emitting face 96. Grooves 97 and 98 intersect at a non-reflecting face 99.

Analysis of the device of FIGURE 6 shows that it too is capable of both beam scanning in a manner similar to that of the device shown in FIGURE 5. However, since the N-type region is here divided into zones, negative voltages with respect to the P-type region are applied to each of the zones from independently variable DC sources 100. Proper variation of these voltages enables beam scanning, beam deflection, or both, in the plane of the junction.

FIGURE 7 illustrates a diode 105 having an emitting face 106 parallel to a reflecting face 107, and with one of the opposite conductivity type regions, here assumed to be the P-type region, separated into three zones by grooves 108 and 109. Groove 108 is curved on nonlinear and directed generally obliquely with respect to emitting face 106. Grooves 108 and 109 intersect at a non-reflecting face 110.

In a manner similar to that shown for the device of FIGURE 5, an analysis of the device of FIGURE 7 reveals that this device is also capable of continuous beam scanning, similar to the device shown in FIGURE 5, and hence is also capable of beam deflection. Again, beam scanning depends only upon proper variation of the voltage amplitudes applied to the zones of the P-type region.

FIGURE 8 illustrates still another grooved diode configuration capable of producing beam deflection and continuous beam scanning. This laser device comprises a diode 115 having an emitting face 116 parallel to a reflecting face 117, with one of the opposite conductivity type regions, here assumed to be the P-type region, separated into three zones by grooves 118 and 119. Grooves 118 and 119 are both nonlinear and directed generally obliquely with respect to emitting face 116. Both grooves 118 and 119 originate at one corner of the P-type region of diode 115 and extend to the opposite corner thereof. However, the slope of groove 118 changes oppositely to the slope of groove 119.

An analysis of diode 115 of FIGURE 8, conducted in a fashion similar to the analysis of diode 80 in FIGURE 5, reveals that diode 115 is capable of beam deflection and continuous beam scanning in a manner similar to that of diode 80. Again, proper variation of the voltages supplied to the zones of diode 115 is necessary, in order to achieve beam deflection in the plane of the junction, continuous beam scanning across the plane of the junction, or both.

FIGURE 9A is a top-view illustration of four diodes 125–128, without headers, each having the same groove configuration as diode 105 of FIGURE 7. Since, as already pointed out in the description of FIGURE 7, each of diodes 125–128 is capable of producing a continuously scanning laser beam, it is possible, by proper sequence of energization, to cause diode 125 to emit a beam from its emitting face 129, diode 126 to produce a beam from its emitting face 130, diode 127 to produce a beam from its emitting face 131 and diode 128 to produce a beam from its emitting face 132, in this sequential order. If the diodes are placed side-by-side, as shown in FIGURE 9A, and if the beam from diode 125 is first made to scan from the upper non-reflecting side 121 to the lower non-reflecting side 122 in the manner described regarding diode 105 of FIGURE 7, and then diode 126 is made to scan its beam from its upper non-reflecting side 123 to its lower non-reflecting side 124 in this manner, followed by diode 127 in the same fashion and thence by diode 128 in the same fashion, the net result will be essentially continuous scanning of the laser beam from the upper non-reflecting surface 121 of diode 125 to the lower non-reflecting surface 133 of diode 128. This effect may be utilized for continuous scanning in a device such as diode 135, shown in FIGURE 9B, wherein the four separate diodes of FIGURE 9A are integrally formed as a single diode unit, thereby assuring that the P-N junction lies in a single plane. In addition, an economy in the number of contacts required to the grooved region is also effected. This may be determined from FIGURES 9A and 9B, since the individual diodes of FIGURE 9A each require three contacts, making a total of twelve, while the single diode of FIGURE 9B requires but eight contacts. In a device wherein a large number of diodes are replaced by a single many-zoned diode, the decrease in contacts approaches 50%.

FIGURE 10 illustrates a many-zoned diode 140, similar in construction to diode 135 of FIGURE 9B, made up of the equivalent of six diodes having groove configurations similar to diode 105 of FIGURE 7. Diode 140 is mounted on a header 141, which is grounded. Fabry-Perot faces 142 and 143 of the diode are plane parallel along their entire lengths at their intersections with the junction.

For illustrative purposes, it is assumed that the grooved region is the P-type conductivity region of the diode. These grooves divide the P-type region into ten zones designated 1–4, 1'–3' and 1"–3". Energization of each of the various zones is provided by a plurality of distributors 145, 146 and 147, each of which may comprise for example, a stepping switch, or individual switches driven by respective stages of a three-stage ring counter. Distributor 145 energizes zones 1'–3' in sequence, distributor 147 energizes zones 1"–3" in sequence, and distributor 146 energizes zones 1–3 in sequence, with zone 4 being energized simultaneously with zone 1.

Distributors 145–147 are driven from a clock pulse generator 148 at a common frequency. However, distributor 146 is driven through an inverter 149, so as to lead distributors 145 and 147, which are driven in synchronism, by a phase angle of 180°.

Current furnished to the various zones of diode 140 by distributors 145–147 is supplied from a triangular wave current generator 150, which is synchronously driven by clock pulse generator 148. Current produced by triangular wave generator 150 is supplied to distributors 145, 146 and 147 through variable resistance 151, 152, and 153, respectively, so as to facilitate individual control of current amplitude supplied to sectors 1'–3', 1'–4' and 1"–3", respectively. Current furnished by triangular wave generator 150 to variable resistance 152, however, is supplied through an inverter 154, thereby shifting the phase of current supplied to distributor 146 by 180° with respect to current supplied to distributors 145 and 147.

Operation of the system of FIGURE 10 may be understood by referring to the waveforms illustrated in FIGURE 11. Thus, when the system is first energized, distributor 146 is switched into its first position prior to production of the first clock pulse. Upon initiation of the first pulse from clock 148, triangular wave generator 150 output current begins to increase, as shown in FIGURE 11. However, inverter 154 output current, which at this instant is a maximum, is applied through distributor 146 to zone 1. Additionally, upon initiation of the first pulse from clock 148, each of distributors 145 and 147 switches to its first position, coupling the increasing triangular wave current from resistances 151 and 153, respectively, to sectors 1' and 1", respectively. Current now applied to zones 1' and 1" thus increase, while current applied to zone 1 decreases.

Upon completion of the first output pulse of clock 148, distributor 146 is driven into its second position, and current now applied to zone 2 from inverter 154 begins to increase, while current applied to zones 1' and 1" begins to decrease. This condition continues until initiation of the second output pulse of clock 148, at which time the current applied to zones 1' and 1" has reached a minimum and current applied to zone 2 has reached a maximum. At this instant, each of distributors 145 and 147 is driven into its second position, causing current applied to zones 2' and 2", respectively to begin to increase; simultaneously, current in zone 2 begins to decrease. This condition continues until cessation of the second output pulse from clock 148, at which time distributor 146 is driven into its third position, allowing current applied to zone 3 to begin to increase while current in zones 2' and 2" begins to decrease. This condition continues until the initiation of the third clock pulse, which drives distrbutors 145 and 147 into their third positions. Current appled to zones 2' and 2" thus ceases; simultaneously, an increasing current is applied to zones 3' and 3", while current applied to zone 3 begins to decrease. This condition continues until completion of the third clock pulse, at which time distributor 146 is driven into its first position, thereby removng current from zone 3 and applying an increasing current to zones 1 and 4; simultaneously, current applied to zones 3' and 3" starts diminishing from its maximum. This condition prevails until initiation of the fourth clock pulse, which drives distributors 145 and 147 into their first positions. Current applied to zones 3' and 3" thus ceases; an increasing current is applied to zones 1' and 1" while current applied to zones 4 and 1 begins to decrease. This conidtion continues until the completion of the fourth clock pulse, whereupon distributor 146 switches into its second position, current in zones 1 and 4 ceases, current in zone 2 begins to increase, and current in zones 1' and 1" begins to decrease.

The foregoing description of the order in which current is applied to the various zones of diode 140 may be summarized by the following sequence: substantially heavy current in zone 1 decreases while current in zones 1' and 1" builds toward maximum; cessation of current in zone 1 and initiation of increasing current in zone 2 when current in zones 1' and 1" begins to decrease from maximum, cessation of current in zones 1' and 1" and initiation of increasing current in zones 2' and 2" when current in zone 2 begins to decrease from maximum, etc. The zones of maximum current are thus controlled so as to continuously progress at a controlled rate along the entire length of the diode, emerging from emitting face 142 and 143. Since the gain of each diode section underlying its respective zone is dependent upon the current density therein, the high gain region of diode 140 also progresses through the various diode sections in a continuous manner, in unison with the high current density sections. Therefore the laser beam also progresses along the entire length of the diode, emerging from emitter face 142 at one end thereof, and travelling continuously along the face to the opposite end thereof, at which time the beam reemerges at the one end of the emitting face. Thus, cotninuous scanning of the laser beam may be obtained over relatively large lengths, and in repetitive fashion if desired.

It should be noted that the diode of FIGURE 10 may be formed in the shape of a cylinder, with the grooved P-type region on the outside, the N-type region on the inside, and the junction region intermediate the N-type regions. Thus, in FIGURE 12, a right cylindrical diode 160 is shown, having a grooved outer P-type region 161, an inner N-type region 162, and a P-N junction region 165. Parallel faces 164 and 165, the planes of which are perpendicular to the cylindrical P-N junction region, comprise the laser Fabry-Perot faces, with face 163 comprising the emitting face. Contact with zones of the P-type region is made in a manner similar to that described for diode 140 of FIGURE 10, while contact with the N-type region may be made by soldering an electrode, with donor type solder, to the N-type region of the diode at face 164. Thus, each section of the diode respectively situated between each of the zones of P-type region 161 and the longitudinal axis 166 of the diode, may be independently forward biased. With a diode of this nature, the beam can be made to continually scan unidirectionally, in circular fashion, without any discontinuity when the beam is returned from its finishing point to its starting point prior to initiation of the next complete scan.

The foregoing describes a semiconductor junction laser having means for electronically displacing and deflecting a beam of stimulated coherent radiation so as to achieve beam scanning or switching. The invention obviates any necessity for mechanical movement in order to achieve scanning, switching, or both. The laser is simple to fabricate, and is operable with grooves of many different configurations in the P-type regions of the diode.

While only certain preferred features of the invention have been shown by way of illustration, many modifications and changes will occur to those skilled in the art. It is, therefore, to be understood that the appended claims are intended to cover all such modifications and changes which fall within the true spirit and scope of the invention.

What I claim as new and desire to secure by Letters Patent of the United States is:

1. A semiconductor junction laser for emitting coherent radiation from a selectively controllable location along one surface of a pair of parallel reflecting surfaces of said laser, said laser comprising a monocrystalline body of direct transition semiconductive material having a pair of degenerate opposite conductivity type regions contiguous with and defining a thin junction region in said monocrystalline body, said junction region being disposed orthogonally between said pair of parallel reflecting surfaces of said laser, and at least one of said opposite conductivity type regions being divided into a plurality of zones separated by at least one strip of high resistance directed generally obliquely to said pair of parallel reflecting surfaces.

2. The semiconductor junction laser of claim 1 wherein said junction region is of planar configuration.

3. The semiconductor junction laser of claim 2 wherein said strip of high resistance comprises a grooved portion of said one of said opposite conductivity type regions.

4. The semiconductor junction laser of claim 3 including a second pair of parallel reflecting surfaces situated orthogonally with respect to the first-named pair of parallel reflecting surfaces and with respect to said junction, wherein said one of said opposite conductivity type regions is divided into four zones separated by a pair of intersecting grooves, each of said grooves being directed generally obliquely to each of said reflecting surfaces.

5. The semiconductor junction laser of claim 3 wherein said one of said opposite conductivity type regions is divided into a trio of zones separated by a pair of nonparallel grooves, each of said grooves being directed generally obliquely to said pair of parallel reflecting surfaces along separate linear paths, respectively.

6. The semiconductor junction laser of claim 3 wherein said one of said opposite conductivity type regions is of P-type conductivity and the other of said regions is of N-type conductivity.

7. The semiconductor junction laser of claim 3 wherein said one of said opposite conductivity type regions is divided into a plurality of zones separated by a plurality of grooves, each of said grooves being directed generally obliquely to said parallel reflecting surfaces.

8. The semiconductor junction laser of claim 7 wherein each of said grooves is directed along a non-linear path.

9. The semiconductor junction laser of claim 2 wherein said one of said opposite conductivity type regions is divided into a trio of zones separated by a pair of nonparallel strips of high resistance, each of said strips of high resistance being directed generally obliquely to said pair of parallel reflecting surfaces.

10. The semiconductor junction laser of claim 9 wherein one of said strips of high resistance is directed along a linear path and the other of said strips of high resistance is directed along a nonlinear path.

11. The semiconductor junction laser of claim 10 wherein said strips of high resistance each comprise a grooved portion of said one of said opposite conductivity type regions respectively.

12. The semiconductor junction laser of claim 11 including bias means coupled to said monocrystalline body for independently forward biasing each section of said body respectively underlying each of said zones.

13. The semiconductor junction laser of claim 9 wherein one of said strips of high resistance is directed along a first nonlinear path and the other of said strips of high resistance is directed along a second nonlinear path.

14. The semiconductor junction laser of claim 13 wherein said strips of high resistance each comprise a grooved portion of said one of said opposite conductivity type regions respectively.

15. The semiconductor junction laser of claim 14 including bias means coupled to said monocrystalline body for independently forward biasing each section of said body respectively underlying each of said zones.

16. The semiconductor junction laser of claim 9 including bias means coupled to said monocrystalline body for independently forward biasing each section of said body respectively underlying each of said zones.

17. The semiconductor junction laser of claim 2 including bias means coupled to said monocrystalline body for independently forward biasing the sections of said body underlying said zones.

18. The semiconductor junction laser of claim 1 wherein said junction region is of right cylindrical configuration about a longitudinal axis.

19. The semiconductor junction laser of claim 18 wherein said one of said opposite conductivity type regions is divided into a plurality of zones separated by a plurality of grooves, each of said grooves being directed generally obliquely to said pair of parallel reflecting surfaces.

20. The semiconductor junction laser of claim 19 including bias means coupled to said monocrystalline body for independently forward biasing each section of said body respectively situated between each of said zones and the longitudinal axis of said body.

References Cited

UNITED STATES PATENTS 3,295,911    1/1967    Ashkin et al.
3,340,479    9/1967    Ashkin.

OTHER REFERENCES

Dill: "Semiconductor Scanlaser," IBM Technical Disclosure Bulletin, vol. 8, pp. 272–273, July 1965.

Marinace et al.: "Injection Laser With Controlled Frequency Mode Switching," IBM Technical Disclosure Bulletin, vol. 7, p. 336, September 1964.

JEWELL H. PEDERSEN, *Primary Examiner.*

E. BAUER, *Assistant Examiner.*

U.S. Cl. X.R.

317—235